(12) United States Patent
Hjerpe et al.

(10) Patent No.: US 12,304,154 B2
(45) Date of Patent: May 20, 2025

(54) FOLDABLE INFLATABLE STRUCTURE

(71) Applicant: Volvo Car Corporation, Gothenburg (SE)

(72) Inventors: Erik Hjerpe, Torslanda (SE); Nathan Nuzzo, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 712 days.

(21) Appl. No.: 16/827,750

(22) Filed: Mar. 24, 2020

(65) Prior Publication Data

US 2020/0307118 A1     Oct. 1, 2020

(30) Foreign Application Priority Data

Apr. 1, 2019 (EP) .................................. 19166578

(51) Int. Cl.
  *B29C 65/00*   (2006.01)
  *B29C 65/62*   (2006.01)
  (Continued)

(52) U.S. Cl.
  CPC .......... *B29C 66/1122* (2013.01); *B29C 65/62* (2013.01); *B29C 66/71* (2013.01);
  (Continued)

(58) Field of Classification Search
  CPC ....... B29C 66/112; B29C 65/62; B29C 66/71; B32B 5/073; B32B 37/0076;
  (Continued)

(56) References Cited

U.S. PATENT DOCUMENTS 6,042,186 A * 3/2000 Kojic ........................ A47C 4/54
                                                    5/59.1
2009/0078186 A1   3/2009 Rista
2014/0248003 A1   9/2014 Mogil et al.

FOREIGN PATENT DOCUMENTS

CN    102438917 A   5/2012
CN    202409936 U   9/2012
(Continued)

OTHER PUBLICATIONS

Oct. 28, 2021 First Office Action issued in International Application No. 202010250086.9.
(Continued)

*Primary Examiner* — Maria V Ewald
*Assistant Examiner* — Ethan Weydemeyer
(74) *Attorney, Agent, or Firm* — Clements Bernard Walker; Christopher L. Bernard; Devin Cummins

(57) ABSTRACT

The present disclosure relates to an inflatable structure transformable between a deflated state and an inflated state. The inflatable structure comprises a drop stitch fabric having a first layer and a second layer tethered by drop stitches. The inflatable structure is provided with one or more folding lines defining the inflatable structure into two or more interconnected chambers, the one or more folding lines comprising coupling means coupling the first layer to the second layer. Dimensions of the one or more folding lines and/or coupling means are adapted to enable the inflatable structure to in both the deflated state and the inflated state be foldable along the one or more folding lines. The disclosure also relates to a method for manufacturing a foldable inflatable structure in accordance with the foregoing.

14 Claims, 9 Drawing Sheets

(51) Int. Cl.
*A01K 1/02* (2006.01)
*B29L 22/02* (2006.01)
*B32B 5/06* (2006.01)
*B32B 37/00* (2006.01)
*B32B 38/00* (2006.01)
*D03D 1/02* (2006.01)
*D06H 5/00* (2006.01)

(52) U.S. Cl.
CPC ......... *A01K 1/0245* (2013.01); *B29L 2022/02* (2013.01); *B32B 5/073* (2021.05); *B32B 37/0076* (2013.01); *B32B 2038/008* (2013.01); *B32B 2255/02* (2013.01); *D03D 1/02* (2013.01); *D06H 5/00* (2013.01)

(58) Field of Classification Search
CPC .......... B32B 2038/008; B32B 2255/02; A01K 1/0245; B29L 2022/02; D03D 1/02; D06H 5/00
See application file for complete search history.

(56) References Cited

FOREIGN PATENT DOCUMENTS

| | | |
|---|---|---|
| CN | 203063891 U | 7/2013 |
| CN | 107548285 U | 1/2018 |
| CN | 107567401 A | 1/2018 |
| CN | 110944905 A | 3/2020 |
| DE | 102017010812 A1 | 1/2019 |
| WO | 2018170337 A2 | 9/2018 |

OTHER PUBLICATIONS

Oct. 9, 2019 European Search Report Issued on International U.S. Appl. No. 19/166,578.

* cited by examiner

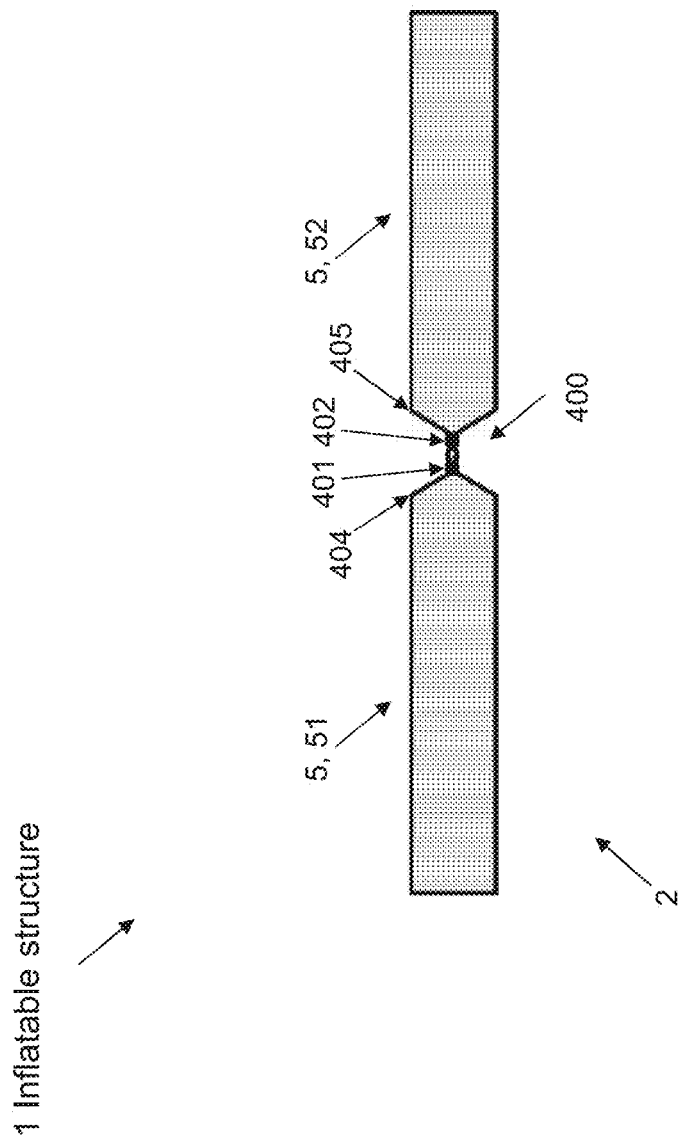

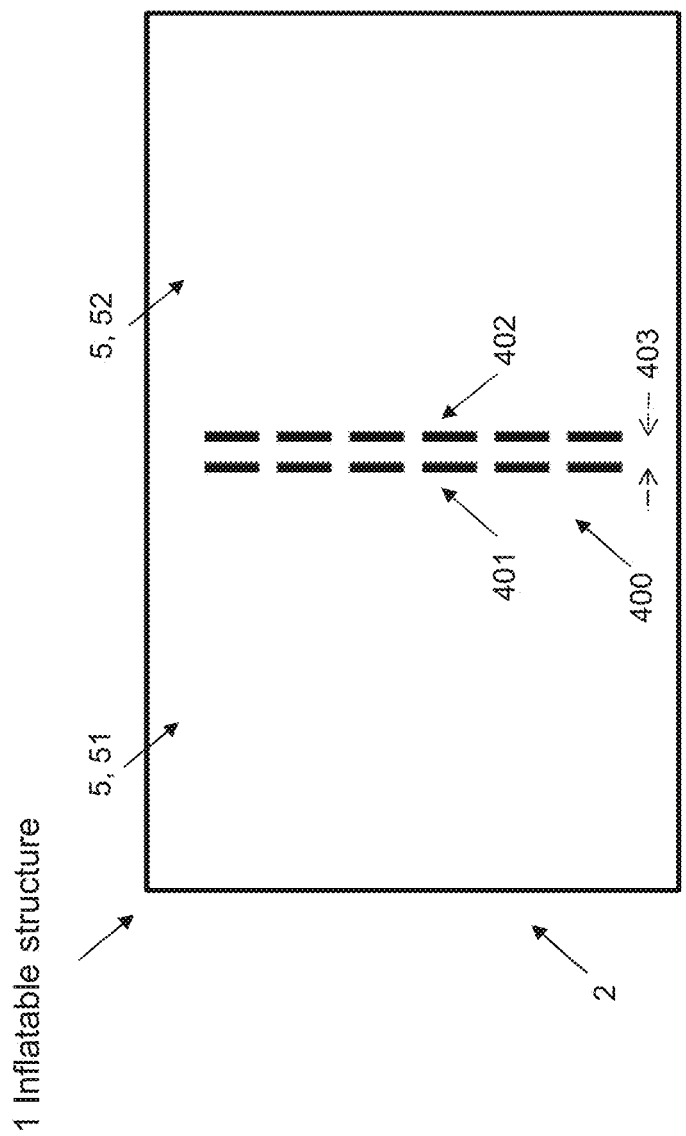

FOLDABLE INFLATABLE STRUCTURE

CROSS-REFERENCE TO RELATED APPLICATION

The present disclosure claims the benefit of priority of co-pending European Patent Application No. 19166578.5, filed on Apr. 1, 2019, and entitled "FOLDABLE INFLATABLE STRUCTURE," the contents of which are incorporated in full by reference herein.

TECHNICAL FIELD

The present disclosure relates to a foldable inflatable structure and a method for manufacturing thereof.

BACKGROUND

Products based on inflatable drop stitch technology are becoming increasingly popular, not the least since such products—e.g. kayaks, floats, gym mats etc.—when deflated, may be less bulky and hence more easily stored and/or transported, and further, be less heavy and/or less costly, than corresponding products of traditional material.

Commonly, an inflatable drop stitch may be e.g. a PVC-coated and/or laminated nylon and/or polyester fabric with layers joined by a dense array of e.g. vertical linear and/or zigzag fibers and/or polyester strands that are uniform in size. When the inflatable drop stitch then is adapted—e.g. glued and/or welded—into desired shape, and subsequently pressurized with air, it may be transformed into a strong, firm structure. The vertical fibers and/or strands—which may be referred to as the drop stitches—hold the air chamber firmly in shape, thus allowing the inflated structure to maintain its shape and stability under heavy outside pressure and impact.

When an inflatable drop stitch product is deflated to, for instance, be transported and/or stored, it may commonly be rolled and/or wrapped—to the extend characteristics of the drop stitch fabric so allow—into a relatively compact volume. Drop stitch fabric, however, commonly makes inflatable drop stitch products stiff and ungainly. Accordingly, rolling and/or wrapping of a drop stitch product may put stress on the drop stitch fabric, which potentially may result in cracks thereon.

Moreover, more complex inflatable drop stitch products, e.g. an inflatable drop stitch kayak, may consist of multiple inflatable drop stitch structures attached—e.g. glued—to one another, to form said exemplifying kayak. Such multi-structure products may, however, cause complexity and/or weakness, and further come at a high production cost.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended dependent claims, in the following description and in the drawings.

The disclosed subject matter relates to an inflatable structure transformable between a deflated state and an inflated state. The inflatable structure comprises a drop stitch fabric having a first layer and a second layer tethered by drop stitches. The inflatable structure is provided with one or more folding lines defining the inflatable structure into two or more interconnected chambers, the one or more folding lines comprising coupling means coupling the first layer to the second layer. Dimensions of the one or more folding lines and/or coupling means are adapted to enable the inflatable structure to be foldable along the one or more folding lines.

The disclosed subject matter further relates to a method for manufacturing a foldable inflatable structure. The inflatable structure is transformable between a deflated state and an inflated state. The inflatable structure comprises a drop stitch fabric having a first layer and a second layer tethered by drop stitches. The method provides the inflatable structure with one or more folding lines defining the inflatable structure into two or more interconnected chambers, the one or more folding lines comprising coupling means coupling the first layer to the second layer. Dimensions of the one or more folding lines and/or coupling means are adapted to enable the inflatable structure to in both the deflated state and the inflated state be foldable along the one or more folding lines.

Thereby, there is introduced an approach according to which an inflatable structure is foldable. That is, since the inflatable structure is transformable between a deflated state and an inflated state, and further, since the inflatable structure comprises a drop stitch fabric having a first layer and a second layer tethered by drop stitches, the inflatable structure has the potential to in an inflated state be transformed into a strong, firm structure, which by means of the drop stitches may be held firmly in place, thus allowing the inflatable structure to maintain its shape and stability under heavy outside pressure and impact. Moreover, that is, since the inflatable structure is provided with one or more folding lines defining the inflatable structure into two or more interconnected chambers, the one or more folding lines comprising coupling means coupling the first layer to the second layer, wherein dimensions of the one or more folding lines and/or coupling means are adapted to enable the inflatable structure to in both the deflated state and the inflated state be foldable along the one or more folding lines, in addition to the drop stitches tethering the first layer to the second layer, coupling means of one or more folding lines additionally couple the first layer to the second layer. As a result thereof, characteristics and/or properties of the inflatable structure and/or the drop stitch fabric are altered and/or different along the folding lines as compared to where folding lines are not present. Thus, the folding lines are designed to represent suitable elongated folding locations, and to support folding in a manner superior as compared to folding where said lines are not present. Accordingly, the introduced approach provides distinct lines across portions of the drop stitch fabric, along which lines folding is advantageous. As a result thereof, the inflatable structure may be folded in a controlled manner along the one or more folding lines, and/or along elongations thereof. Accordingly, with an inflatable structure according to the introduced approach, since the inflatable structure is foldable in the deflated state along the one or more folding lines, material stress and potentially cracks commonly experienced on inflatable structures of the prior art from uncontrolled rolling and/or wrapping in a deflated state, may be avoided. Moreover, since the inflatable structure is foldable also in the inflated state along the one or more folding lines, a complex inflatable product may be derived from a single drop stitch fabric, rather than—as commonly known in the art—by e.g. gluing together multiple drop stitch structures of separate drop stitch fabrics into a final inflatable product.

The technical features and corresponding advantages will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which:

FIGS. 4A-4C illustrate schematic views of a portion of an exemplifying inflatable structure in an inflated state according to embodiments of the disclosure.

DESCRIPTION OF EMBODIMENTS

Figure 1A:
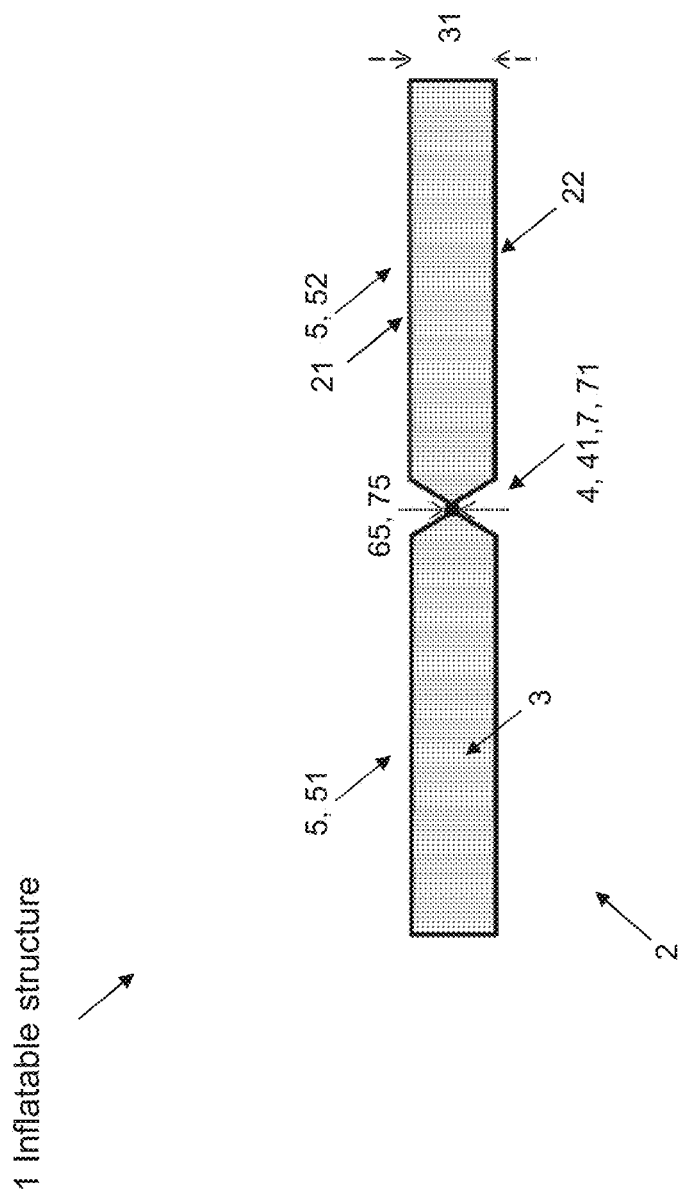
FIGS. 1A-1C illustrate schematic views of a portion of an exemplifying inflatable structure in an inflated state according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to an inflatable structure transformable at least between a deflated state and an inflated state, there will be disclosed an approach according to which said inflatable structure is foldable.

Figure 1B:
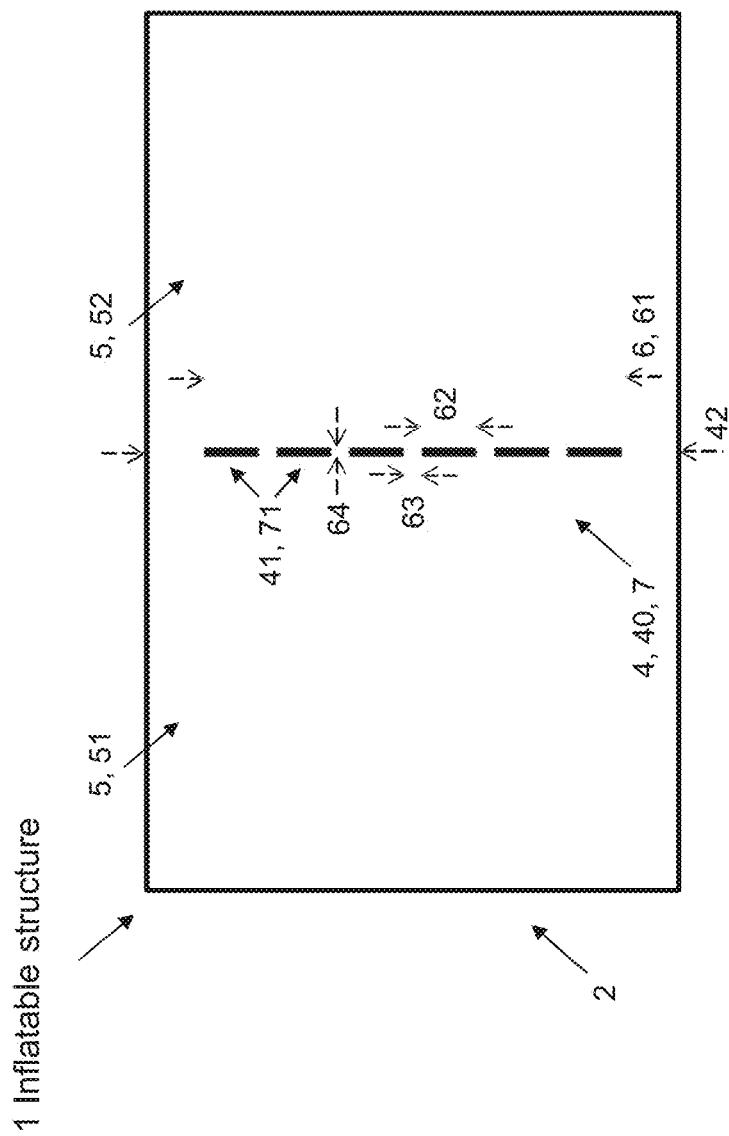
Figure 1C:
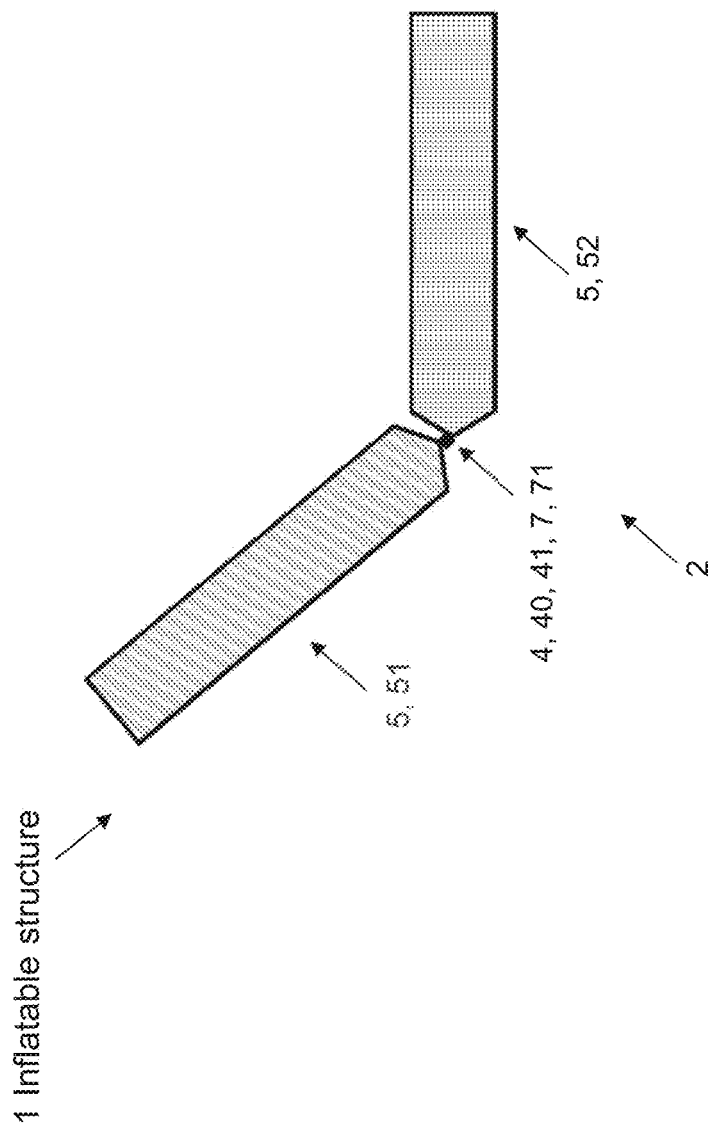

Referring now to the figures and FIG. 1 in particular, there is depicted schematic views of a portion of an exemplifying inflatable structure 1 in an inflated state according to embodiments of the disclosure. FIG. 1a illustrates a side view of the inflatable structure 1 unfolded, FIG. 1b a top view of the unfolded inflatable structure 1, and FIG. 1c a side view of the inflatable structure 1 partially folded. The inflatable structure 1 may be represented by any inflatable product and/or article deemed feasible and/or applicable for the introduced approach. The inflatable structure 1 may thus for instance be represented by an inflatable pet cage or the like, which further for instance may be carried on-board a vehicle such as—e.g. in the inflated state—placed in a luggage compartment thereof. According to another example, the inflatable structure may be represented by an inflatable child seat. The expression "inflatable" may refer to "pressurizable", whereas "structure" may refer to "arrangement", "article", "product" and/or "body".

The inflatable structure 1 is transformable between a deflated state and an inflated state, the latter exemplified in FIG. 1. The deflated state may refer to a condition of the inflatable structure 1 in which the inflatable structure 1 is not pressurized, and may for instance be desirable for storage and/or transportation of the inflatable structure 1. Correspondingly, the inflated state may refer to a condition of the inflatable structure 1 in which the inflatable structure 1 is pressurized—e.g. at least up to a predetermined and/or predetermineable value, pressure and/or percentage of e.g. a maximum potential pressure to which the inflatable structure 1 may be inflated—and which state further may be referred to as a state for intended use of the inflatable structure 1. The expression "inflatable structure transformable" between a deflated and an inflated state, may refer to "inflatable structure adapted to transition and/or change" between a deflated and an inflated state. "Deflated" state, on the other hand, may refer to "unpressurized" state and/or "storage and/or transportation" state, whereas "inflated" state may refer to "pressurized" state and/or "usage and/or intended use" state. The expression "state" may refer to "condition" and/or "mode".

The inflatable structure 1 comprises a drop stitch fabric 2 having a first layer 21 and a second layer 22 tethered by drop stitches 3. Thereby, the inflatable structure 1 has the potential to in an inflated state be transformed into a strong, firm structure. That is, the drop stitches 3 may in the inflated state hold the inflatable structure 1 firmly in shape, thus allowing the inflatable structure 1 to maintain its shape and stability under heavy outside pressure and impact.

The drop stitch fabric 2 may refer to any drop stitch fabric commonly known in the art, and be of any dimensions—e.g. width and/or length—deemed suitable for the inflatable structure 1 at hand, e.g. range from tens of millimetres up to tens of metres. In a similar manner, the first layer 21 and the second layer 22 may refer to any drop stitch layers commonly known, and be of any thickness deemed suitable for the inflatable structure 1 at hand, e.g. range from tenths of millimetres up to several millimetres, and/or comprise any material commonly known, such as for instance nylon and/or polyester. Moreover, the first layer 21 and/or the second layer 22 may each be represented by a respective set of layers lying on top of another in a known manner, which layers may or may not comprise different materials. Yet again, in a similar manner, the drop stitches 3 may be represented by any drop stitches known in the art, e.g. be represented by fibers, strands and/or threads e.g. comprising polyester material and moreover e.g. be provided in a linear, zigzag and/or random pattern. The drop stitches 3 may further be of any dimensions and/or characteristics deemed suitable for the inflatable structure 1 at hand, and for instance may a length of the drop stitches 3, i.e. a drop stitches length 31, range from a few millimetres up to hundreds of millimetres. Although in the Figures the drop stitches 3 in vicinity of the one or more folding lines 4 (described further on) are illustrated as shorter, it may be noted that the length 31 of the drop stitches 3 may be constant across the drop stitch fabric 2. The drop stitches 3 may in a commonly known manner extend through the first layer 21 and the second layer 22, and further—should the first 21 and/or the second 22 layer be represented by a respective set of layer—then the drop stitches 3 may extend through one, a few or all of the layers in the respective set. The drop stitch fabric 2, the first layer 21, the second layer 22 and the drop stitches 3 may further be provided and/or manufactured, and/or have been manufactured, in any commonly known manner, with support from e.g. a weaving, sewing, stitching and/or loom machine and/or system.

The expression "drop stitch fabric" may refer to "uniform, integral and/or undivided drop stitch fabric", "drop stitch fabric with a uniform extension area" and/or "two-layer fabric", whereas "fabric" may refer to "material" and/or "cloth". The expression "layer", on the other hand, may refer to "set of parallel layers" and/or "essentially and/or at least partly parallel layers", whereas "tethered" by drop stitches may refer to "tethered by a dense array" of drop stitches and further to "coupled", "joined" and/or "held" by drop stitches. "Drop stitches" may refer to "spacer threads" and/or "vertical stitches", and further to "drop stitches there between".

The inflatable structure 1 and/or the drop stitch fabric 2—or portions thereof—may optionally be coated and/or sealed. Thereby, the inflatable structure 1 may be made airtight and/or gas proof, i.e. the inflatable structure 1 may—following upon inflation thereof 1—be able to remain in the inflated state without air seeping out. Coating and/or sealing may be provided in any manner—e.g. known in the art—enabling the inflatable structure 1 to be airtight, and for instance be represented by one or more commonly known layers of coating, e.g. PVC, urethane and/or Hypalon, and/or commonly known patches. The expression "the inflatable structure and/or the drop stitch fabric" may be coated and/or sealed may refer to "the first and the second layers of the inflatable structure and/or the drop stitch fabric" may be coated and/or sealed, whereas "coated" may refer to "provided with coating" and/or "provided with one or more coating layers". "Sealed", on the other hand, may refer to "one or more edges and/or folding lines thereof sealed". According to an example, the phrase "coated and/or sealed" may refer to "coated and/or sealed, such that the inflatable structure is airtight".

The inflatable structure 1 is provided with one or more folding lines 4 defining the inflatable structure 1 into two or more interconnected chambers 5. The one or more folding lines 4 comprises coupling means 41 coupling the first layer 21 to the second layer 22. Dimensions 6 of the one or more folding lines 4 and/or coupling means 41 are adapted to enable the inflatable structure 1 to in both the deflated state and the inflated state be foldable along the one or more folding lines 4. Thereby, in addition to the drop stitches 3 tethering the first layer 21 to the second layer 22, coupling means 41 of one or more folding lines 4 additionally couple the first layer 21 to the second layer 22. As a result thereof, characteristics and/or properties of the inflatable structure 1 and/or the drop stitch fabric 2 are altered and/or different along the folding lines 4 as compared to where folding lines 4 are not present. Thus, the folding lines 4 are designed to represent suitable elongated folding locations, and to support folding in a manner superior as compared to folding where said lines 4 are not present. Accordingly, the introduced approach provides distinct lines 4 across portions of the drop stitch fabric 2, along which lines 4 folding is advantageous. As a result thereof, the inflatable structure 1 may be folded in a controlled predeterminable manner along the one or more folding lines 4, and/or along elongations thereof 4. Accordingly, with an inflatable structure 1 according to the introduced approach, since the inflatable structure 1 is foldable in the deflated state along the one or more folding lines 4, material stress and potentially cracks commonly experienced on inflatable structures of the prior art from uncontrolled rolling and/or wrapping in a deflated state, may be avoided. Moreover, since the inflatable structure 1 is foldable also in the inflated state along the one or more folding lines 4, a complex inflatable product 1 may be derived from a single drop stitch fabric 2, rather than—as commonly known in the art—by connecting e.g. gluing together multiple drop stitch structures of separate drop stitch fabrics into a final inflatable product.

The one or more folding lines 4 may respectively be of any form and/or design deemed suitable for the inflatable structure 1 at hand, and for instance respectively be essentially straight. Correspondingly, the coupling means 41 may be represented by any coupling members enabling the first layer 21 to be coupled, be attached, be fixated and/or in an additional or alternative manner be tethered to the second layer 22 along the folding lines 4. The dimensions 6 of the one or more folding lines 4 and/or coupling means 41 may be selected in any manner deemed suitable for the inflatable structure 1 at hand to support that the inflatable structure 1 in both the deflated state and the inflated state is foldable along the one or more folding lines 4. The dimensions 6 may for instance relate to magnitudes of the one or more folding lines 4, such as to what extent 61 a respective folding line 4 extends, to what extent 62 a coupling means 41 extends, a separation distance 63 between two adjacent coupling means 41, a width 64 of a respective folding line 4, and/or a length 65—e.g. in the inflated state—between the first layer 21 and the second layer 22 along respective folding line 4, all of which respectively and/or combined may affect the foldability along the folding lines 4.

The one or more folding lines 4 may be provided—and/or have been provided—in any manner deemed suitable for the inflatable structure 1 at hand, e.g. with support from a folding line providing machine and/or system and/or potentially by hand. The number of folding lines 4—and subsequently the number of interconnected chambers 5—may be selected as deemed suitable for the inflatable structure 1 at hand. The number of folding lines 4 may hence range from e.g. a single folding line up to several or even tens or hundreds of folding lines 4, and correspondingly, the number of interconnected chambers 5 range from e.g. merely two up to tens of chambers 5. In FIG. 1, an exemplifying first interconnected chamber 51 and an exemplifying second interconnected chamber 52 is illustrated. Dimensions of the interconnected chambers 5 may be selected as deemed suitable for the inflatable structure 1 at hand, and further may dimension of one of the interconnected chambers 5 differ from dimensions of another one.

The expression "the inflatable structure" is provided with one or more folding lines may refer to "the drop stitch fabric of the inflatable structure" is provided with one or more folding lines, whereas "is provided with" one or more folding lines may refer to "comprises" and/or "having provided thereon" one or more folding lines. One or more "folding lines", on the other hand, may refer to one or more "elongated folding lines", and further to one or more "essentially straight folding lines". Moreover, one or more "folding lines" may refer to one or more "strips", "dividing lines", "parting lines" and/or "splitting lines". According to an example, one or more "folding lines" may further refer to one or more "seams, welding lines and/or lines with drop stitches of reduced drop stitches length". The expression "defining" the inflatable structure into two or more interconnected chambers may refer to "at least partly separating and/or dividing" the inflatable structure into two or more interconnected chambers. Defining the "inflatable structure" may refer to defining the "drop stitch fabric of the inflatable structure". The expression "interconnected" chambers may refer to "interconnected and/or connected" chambers, "coupled and/or fluidly coupled" chambers and/or "adjacent" chambers, whereas "chambers" may refer to "sections", "panels" and/or "cavities". "Coupling means", on the other hand, may refer to "coupling members", "couplings" and/or "couplers", whereas "coupling" the first layer to the second layer may refer to "coupling narrower and/or tighter than the drop stitches" the first layer to the second layer. Moreover, "coupling" the first layer to the second layer may refer to "bonding", "fixating", "attaching" and/or "tethering and/or tethering in an alternative manner" the first layer to the second layer. The expression "dimensions" may refer to "characteristics", "magnitude(s)", "extensions", "spread(s)", "lengths", "distance(s) between two adjacent coupling means", "stitches length(s)" and/or "stitches length(s) in the inflated state". The expression "adapted to enable" may refer to "adapted to allow" and/or merely "enable". "In both" the deflated state and the inflated state, on the other hand, may refer to "respectively in" the deflated state and the inflated state, whereas "be foldable" may refer to "to some extent be foldable" and/or "be foldable in a controlled, predetermined, predeterminable and/or expected manner". The expression "along" the one or more folding lines may refer to "along extensions of" and/or "along elongations of" the one or more folding lines, and further to "along elongations of the one or more folding lines rendered by" the one or more folding lines. Moreover, the phrase "along the one or more folding lines" may refer to "along the one or more folding lines across the inflatable structure and/or drop stitch fabric" and/or "along the one or more folding lines across the inflatable structure and/or drop stitch fabric from one edge thereof to another". According to an example, the expression "foldable along the one or more folding lines" may refer to "foldable along the one or more folding lines, whereby the inflatable structure in the inflated state is adapted to form a three-dimensional structure defined by the one or more folding lines and in the deflated state is adapted to be folded in a manner defined by the one or more folding lines".

The coupling means 41 may, according to an example, comprise and/or be represented by welds and/or weld spots, whereby the one or more folding lines 4 may be represented by one or more welding lines. In a similar manner, according to another example, the coupling means 41 may additionally or alternatively comprise and/or be represented by drop stitches of reduced length, whereby the one or more folding lines 4 may be represented by one or more lines with drop stitches of reduced length.

Optionally, however, the one or more folding lines 4 may comprise one or more seams 7, and the coupling means 41 comprise stitches 71. Thereby, in addition to the drop stitches 3 tethering the first layer 21 to the second layer 22, coupling stitches 71 of one or more seams 7 may additionally couple the first layer 21 to the second layer 22. As a result thereof, characteristics and/or properties of the inflatable structure 1 and/or the drop stitch fabric 2 are altered and/or different along the seams 7 as compared to where seams 7 are not present. Thus, the seams 7 are designed to represent suitable elongated folding locations, and to support folding in a manner superior as compared to folding where said seams 7 are not present. Accordingly, the introduced approach provides distinct seams 7 across portions of the drop stitch fabric 2, along which seams 7 folding is advantageous. As a result thereof, the inflatable structure 1 may be folded in a controlled manner along the one or more seams 7, and/or along extensions thereof 7. Accordingly, with an inflatable structure 1 according to the introduced approach, since the inflatable structure 1 is foldable in the deflated state along the one or more seams 7, material stress and potentially cracks commonly experienced on inflatable structures of the prior art from uncontrolled rolling and/or wrapping in a deflated state, may be avoided. Moreover, since the inflatable structure 1 is foldable also in the inflated state along the one or more seams 7, a complex inflatable product 1 may be derived from a single drop stitch fabric 2, rather than—as commonly known in the art—by e.g. gluing together multiple drop stitch structures of separate drop stitch fabrics into a final inflatable product.

The one or more seams 7 may respectively be of any form and/or design deemed suitable for the inflatable structure 1 at hand, and for instance respectively be essentially straight. Correspondingly, the coupling stitches 71 may be represented by any stitches enabling the first layer 21 to be coupled, attached, fixated and/or tethered to the second layer 22 along the folding lines 4, i.e. seams 7. The one or more seams 7 may be provided—and/or have been provided—in any manner deemed suitable for the inflatable structure 1 at hand, e.g. with support from a sewing machine and/or system, and/or potentially by hand. The number of seams 7 may be selected as deemed suitable for the inflatable structure 1 at hand, and may range from e.g. a single seam up to several or even tens or hundreds of seams 7.

Further optionally, should the one or more folding lines 4 comprise one or more seams 7 and the coupling means 41 comprise stitches 71, then a coupling stitches length 75 between the first layer 21 and the second layer 22 may be shorter than the drop stitches length 31. Thereby, the shorter length 75 of the coupling stitches 71 comprised in the one or more seams 7—as compared to the length 31 of drop stitches 31 across other portions of the drop stitch fabric 2—may assist in supporting improved foldability along the one or more seams 7. Optionally, the coupling stitches length 75 may be less than half, more preferred less than one third and most preferred less than one tenth of the drop stitches length 31.

The expression "coupling stitches length" may refer to "length of the coupling stitches" whereas "is shorter than" may refer to "is adapted to be shorter than". "A length of the drop stitches", on the other hand, may refer to "a drop stitches length".

Optionally, at least a first folding line 40 out of the one or more folding lines 4—e.g. a first seam out of the one or more seams 7—may have an extent 61 extending at least 50 percent, more preferred at least 60 percent and most preferred at least 70 percent along a corresponding folding line elongation 42 rendered by the at least first folding line 40. Thereby, at least one folding line 40 has an extension 61 in comparison to its fictive elongation 42 from edge to edge of the inflatable structure 1 and/or drop stitch fabric 2, which is of a proportion sufficient to support efficient and/or satisfying folding along said folding line 40.

The expression "extent" may refer to "extension", "spread", "reach" and/or "magnitude", and further to "extent in a longitudinal direction of the at least first folding line". "Extending", on the other hand, may refer to "extending continuously and/or intermittently", whereas "along" a corresponding folding line elongation may refer to "of" a corresponding folding line elongation. The expression "a corresponding folding line elongation" may refer to "the at least first folding line's fictive folding line elongation", whereas folding line "elongation" may refer to folding line "elongation across the inflatable structure and/or drop stitch fabric" and/or "elongation across the inflatable structure and/or drop stitch fabric from one edge thereof to another". Folding line "elongation" may further refer to folding line "extension", whereas "rendered by" the at least first folding line may refer to "defined by" and/or "resulting from" the at least first folding line.

Figure 2:
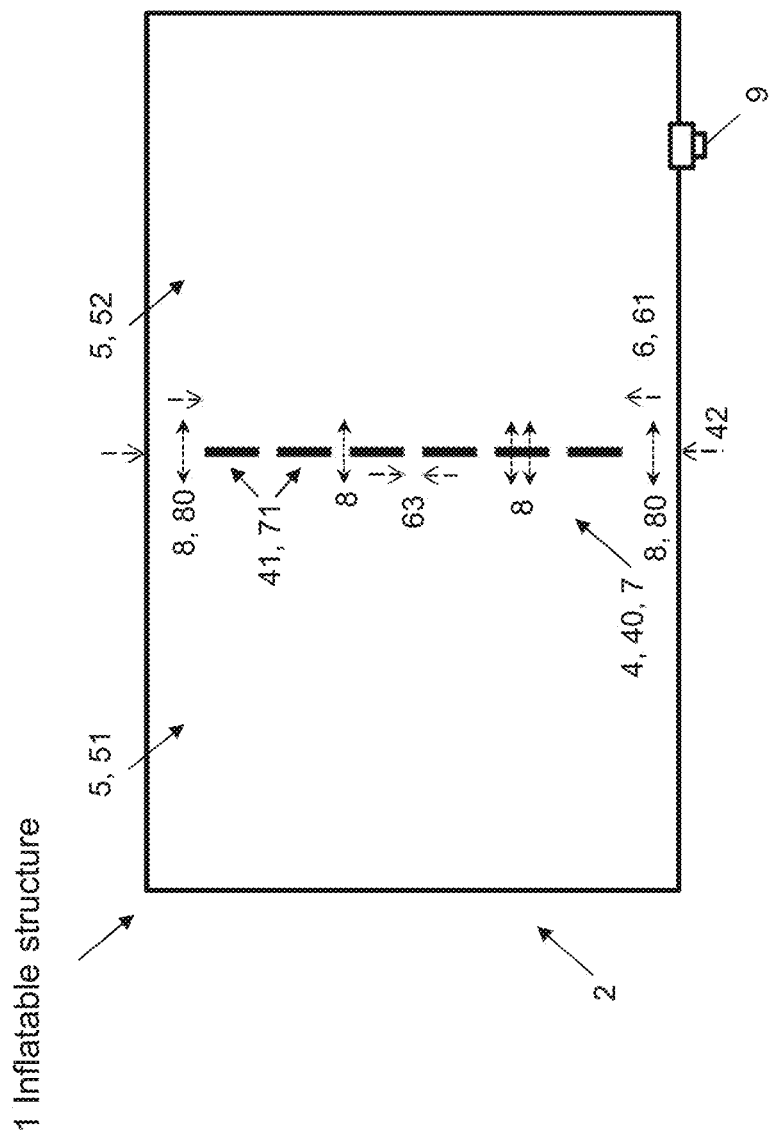
FIG. 2 illustrates a schematic top view of a portion of an exemplifying inflatable structure in an inflated state according to embodiments of the disclosure.

As depicted in FIG. 2, which illustrates a schematic top view of a portion of an exemplifying inflatable structure 1 in an inflated state according to embodiments of the disclosure, the one or more folding lines 4 and/or coupling means 41—e.g. the one or more seams 7 and/or coupling stitches 71—may, optionally, leave one or more air passages 8 within the inflatable structure 1 between the two or more interconnected chambers 5. Thereby, air may flow from one interconnected chamber 5 to another 5—such as for instance to the first interconnected chamber 51 from the second interconnected chamber 52—e.g. during inflation of the inflatable structure 1, but also during deflation of the inflatable structure 1 and/or in the inflated/deflated state. Accordingly, air may flow between the two or more interconnected chambers 5 in an efficient manner. Moreover, the inflatable structure 1 may be inflated as well as deflated utilizing a single ventilation vault 9, that is, a ventilation vault 9 which is common for the entire inflatable structure 1. Accordingly, efficient inflation and/or deflation of the inflatable structure 1 is supported, and subsequently, a hassle with inflation and/or deflation via multiple ventilation vaults may be avoided.

The inflatable structure 1 may thus optionally comprise a ventilation vault 9 for inflation and/or deflation of the inflatable structure 1. The ventilation vault 9 may be represented by any ventilation vault—e.g. known in the art—adapted for inflation and/or deflation of an inflatable drop stitch product. The expression "ventilation vault" may refer to "single ventilation vault", "air and/or gas vault", "vent" and/or "ventilation port", whereas ventilation vault "for inflation and/or deflation" may refer to ventilation vault "adapted for inflation and/or deflation". Inflation and/or deflation "of the inflatable structure", on the other hand, may refer to inflation and/or deflation "of the two or more interconnected chambers of the inflatable structure".

The one or more air passages 8 depend on the dimensions 6 of the one or more folding lines 4 and/or coupling means 41—e.g. the one or more seams 7 and/or coupling stitches 71—and accordingly, said dimensions 6 determine the conditions for said air passages 8. Thus, the dimensions 6 of the one or more folding lines 4 and/or coupling means 41 may, in addition to taking foldability into consideration, be selected and/or adapted taking said air passages 8—and potential demands thereon—in consideration, subsequently finding an appropriate balance there between. For instance may a folding line extent 61, a coupling means extent 62, a separation distance 63 between two adjacent coupling means 41, a folding line width 64, and/or a length 65—e.g. in the inflated state—between the first layer 21 and the second layer 22 along a folding line 4, be adapted.

An air passage 8 may e.g. be disposed—and subsequently air flow—beyond an extent 61 of a folding line 4. Additionally or alternatively, an air passage 8 may e.g. be disposed—and subsequently air flow—across a separation distance 63 between two adjacent coupling means. Moreover, additionally or alternatively, an air passage 8 may e.g. be disposed—and subsequently air flow—across e.g. an entire folding line 4 should a length 65 between the first layer 21 and the second layer 22 along said folding line 4 be of a large enough magnitude to allow air to pass through.

The expression "one or more folding lines and/or coupling means" leave one or more air passages may refer to "dimensions of the one or more folding lines and/or coupling means" leave one or more air passages, and further to "one or more folding lines and/or coupling means are adapted to" leave one or more air passages. According to an example, should the one or more folding lines 4 comprise one or more seams 7, then the expression "one or more folding lines and/or coupling means" leave one or more air passages may refer to "dimensions of the one or more seams and/or the one or more coupling stitches are adapted to" leave one or more air passages. "Leave" air passages, on the other hand, may refer to "provide" and/or "support" air passages, whereas "air" passages may refer to "gas" passages". The expression "air passages" may refer to "gaps through which air may pass", whereas "within" the inflatable structure may refer to "within the drop stitch fabric of" the inflatable structure. According to an example, the phrase "wherein the one or more folding lines leaves one or more air passages within the inflatable structure between the two or more interconnected chambers" may refer to "wherein the one or more folding lines leaves one or more air passages within the inflatable structure between the two or more interconnected chambers, whereby the inflatable structure is inflatable by a common and/or single inflation vault".

Further optionally, at least a first air passage 80 is supported in that at least a first folding line 40—e.g. seam—has an extent 61 extending less than 99 percent, more preferred less than 95 percent and most preferred less than 90 percent along a corresponding folding line elongation 42 rendered by the at least first folding line 40. Thereby, at least one folding line 40 has an extension 61 in comparison to its fictive elongation 42 from edge to edge of the inflatable structure 1 and/or drop stitch fabric 2, which is of a proportion sufficient to support at least a firsts efficient and/or satisfying air passage 80 between adjacent interconnected chambers 5, 51, 52.

The expression that at least a first air passage "is supported in that" may refer to that at least a first air passage is "provided in that and/or formed by that", whereas "at least a first air passage" may refer to "at least a first air passage out of the one or more air passages". Moreover, as previously discussed, the expression "extent" may refer to "extension", "spread", "reach" and/or "magnitude", and further to "extent in a longitudinal direction of the at least first folding line". "Extending", on the other hand, may refer to "extending continuously and/or intermittently", whereas "along" a corresponding folding line elongation may refer to "of" a corresponding folding line elongation. The expression "a corresponding folding line elongation" may refer to "the at least first folding line's fictive folding line elongation", whereas folding line "elongation" may refer to folding line "elongation across the inflatable structure and/or drop stitch fabric" and/or "elongation across the inflatable structure and/or drop stitch fabric from one edge thereof to another". Folding line "elongation" may further refer to "folding line "extension", whereas "rendered by" the at least first folding line may refer to "defined by" and/or "resulting from" the at least first folding line.

Figure 3:
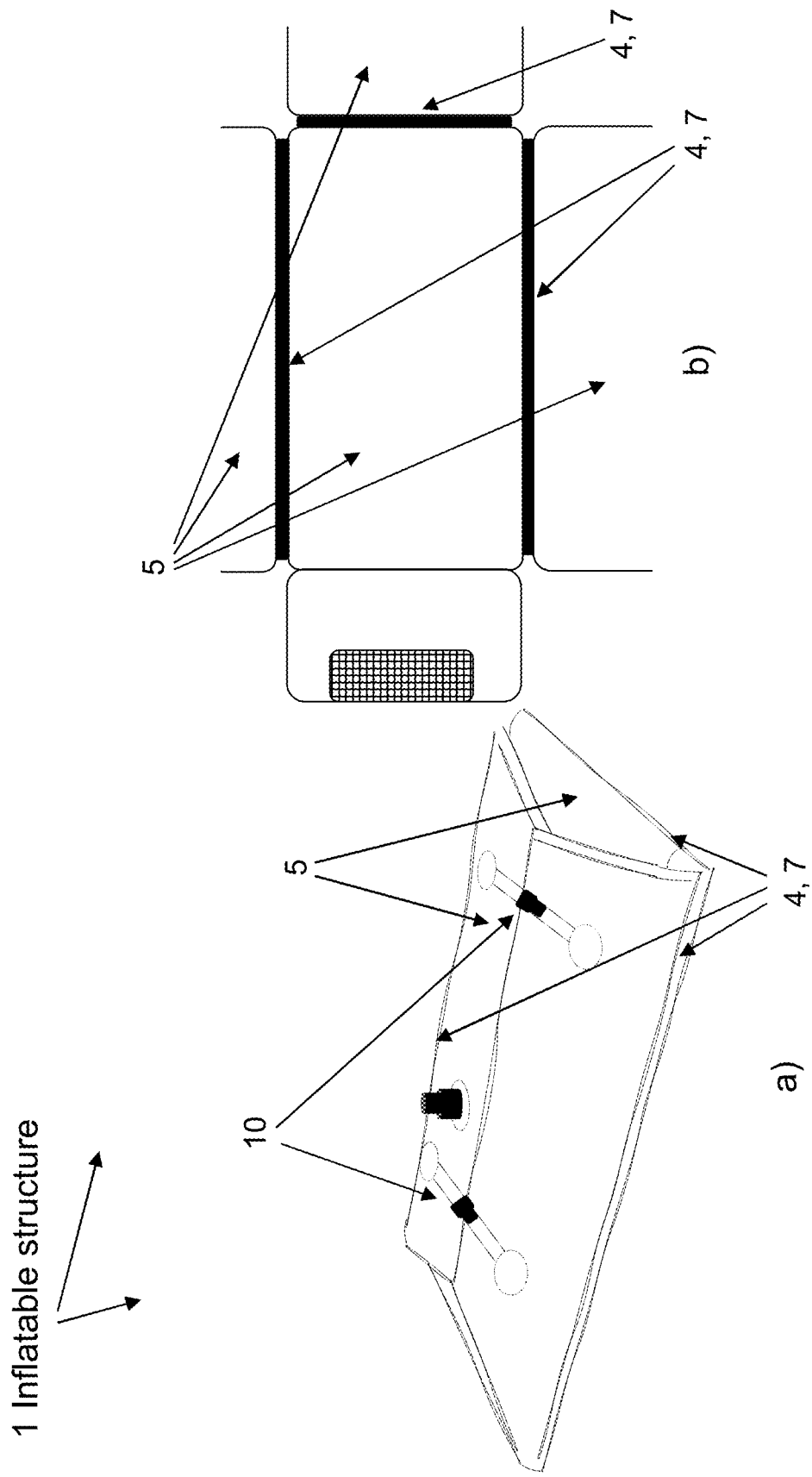
FIG. 3 illustrates an exemplifying inflatable structure according to embodiments of the disclosure.

Optionally, at least one of the two or more interconnected chambers 5 may—in the deflated state—be foldable along the one or more folding lines 4 at least 135 degrees, more preferred at least 150 degrees and most preferred at least 165 degrees. Thereby, and as demonstrated in FIG. 3a which illustrates an exemplifying inflatable structure 1 in a deflated state according to embodiments of the disclosure, interconnected chambers 5 of the inflatable structure 1—here represented by an exemplifying pet cage shown in a trunk of a vehicle—may in the deflated state be folded along the one or more folding lines 4 to a sufficient degree.

To what degree interconnected chambers 5 are foldable in the deflated state may—in addition to other factors such as e.g. material of layers 21, 22, a drop stitches length 31, coating and/or sealing—depend on the dimensions 6 of the one or more folding lines 4 and/or coupling means 41, such as e.g. the seams 7 and/or coupling stitches 71. Accordingly, said dimensions 6 may determine the conditions for to what degree interconnected chambers 5 are foldable in the deflated state. Thus, the dimensions 6 of the one or more folding lines 4 and/or coupling means 41 may be selected and/or adapted taking desired degrees of foldability in the deflated state into consideration. For instance may a folding line extent 61, a coupling means extent 62, a separation distance 63 between two adjacent coupling means 41, and/or a folding line width 64, be adapted.

The expression "at least one of the two or more interconnected chambers in the deflated state is foldable" may refer to "dimensions of the one or more folding lines and/or coupling means are adapted to enable at least one of the two or more interconnected chambers to in the deflated state be foldable". Foldable along "the one or more folding lines", on the other hand, may refer to "foldable along a corresponding folding line out of the one or more folding lines".

Further optionally, the inflatable structure 1 may—in the deflated state—be foldable along the one or more folding lines 4 into a predeterminable flat shape. Thereby, and as demonstrated in FIG. 3*a*, the inflatable structure 1 may in the deflated state be foldable into an expected desired compact structure 1, here an essentially two-dimensional shape. Accordingly, the inflatable structure 1 may then—upon being folded along the folding lines 4 in the deflated state—be conveniently compact, and subsequently efficiently stored and/or transported.

Into what shape the inflatable structure 1 in the deflated state is foldable, may depend on how the one or more folding lines 4 are disposed. Accordingly, a disposition of the folding lines 4, i.e. a folding pattern, may determine the conditions for to what shape the inflatable structure 1—in the deflated state—is foldable. Thus, the disposition and/or distribution of the one or more folding lines 4 may be selected and/or adapted taking a desired flat shape into consideration. For instance, and as demonstrated in FIG. 3*b* which illustrates the exemplifying inflatable structure 1 in FIG. 1. 3*a* unfolded, may folding lines 4 be disposed to form a folding pattern, e.g. mirroring edges of an arbitrarily shaped unassembled box.

The expression "the inflatable structure in the deflated state is foldable" may refer to "a disposition of the one or more folding lines are adapted to enable the inflatable structure to in the deflated state be foldable". Foldable along "the one or more folding lines", on the other hand, may refer to "foldable along a corresponding folding line out of the one or more folding lines". The expression "flat" shape may refer to "essentially flat shape", and further to "two-dimensional" and/or "compact" shape. "Shape", on the other hand, may refer to "form", "design" and/or "structure", whereas "into a predeterminable flat shape" may refer to "into an expected and/or predetermined flat shape" and/or "into a flat shape according to a folding pattern".

Optionally, the inflatable structure 1 may—in the inflated state—be foldable along the one or more folding lines 4 into a predeterminable three-dimensional shape. Thereby, and as demonstrated in FIG. 3*b*, the inflatable structure 1 may in the inflated state be foldable in an intuitive manner into an expected usable product 1, here into an exemplifying pet cage. The inflatable structure 1 may then—upon being folded along the folding lines 4 in the inflated state—be utilized for its intended use, such as e.g. accommodating and/or transporting one or more pets.

Into what shape the inflatable structure 1 in the inflated state is foldable, i.e. its "intended use"-shape, may depend on how the one or more folding lines 4 are disposed. Accordingly, a disposition of the folding lines 4, i.e. a folding pattern, may determine the conditions for to what shape the inflatable structure 1—in the inflated state—is foldable. Thus, the disposition and/or distribution of the one or more folding lines 4 may be selected and/or adapted taking a desired "intended use"-shape into consideration.

Consequently, folding lines 4 may be disposed to form a folding pattern, which—following upon folding in the inflated state along said folding lines 4 and/or according to said folding pattern—results in that the inflatable structure 1 takes on its expected intended use"-shape. For instance, and as demonstrated in FIG. 3*b*, may folding lines 4 be disposed to form a folding pattern e.g. mirroring edges of an arbitrarily shaped unassembled box, here an exemplifying pet cage, which—following upon folding in the inflated state along said folding lines 4 and/or according to said folding pattern—results in that the inflatable structure 1 takes on its expected intended use"-shape, here a usable pet cage.

The expression "the inflatable structure in the inflated state is foldable" may refer to "a disposition of the one or more folding lines are adapted to enable the inflatable structure to in the inflated state be foldable". Foldable along "the one or more folding lines", on the other hand, and as previously discussed, may refer to "foldable along a corresponding folding line out of the one or more folding lines". The expression "three-dimensional shape" may refer to "shape intended for usage of the inflatable structure", whereas "into a predeterminable three-dimensional shape" may refer to "into an expected and/or predetermined three-dimensional shape" and/or "into a three-dimensional shape according to a folding pattern". Three-dimensional "shape", on the other hand, may refer to three-dimensional "form", "design" and/or "structure".

Optionally, the inflatable arrangement 1 may further comprise one or more fastening arrangements 10 adapted to in the inflated state detachably secure the inflatable structure 1 in a three-dimensional shape, and/or adapted to in the deflated state detachably secure the inflatable structure 1 in a flat shape. Thereby may the inflatable arrangement 1, with support from the one or more fastening arrangements 10, be temporarily fixated in a flat shape in the deflated state and/or temporarily fixated in a three-dimensional shape—i.e. in an "intended use"-shape—in the inflated state.

The one or more fastening arrangements 10 may refer to any fastening means, for instance commonly known, adapted to detachably fasten one portion of the fastening means to another. A fastening arrangement 10 may for instance be represented by and/or comprise one or more of straps, zippers, Velcro and buttons. One fastening arrangement 10 may differ from another 10. The number of fastening arrangements 10 provided may be selected as deemed suitable for the inflatable structure 1 at hand, and for instance range from a single fastening arrangement 10 up to tens of fastening arrangements 10. Correspondingly, positioning and/or placement of the one or more fastening arrangements 10 on and/or in the inflatable structure 1 may be selected as deemed suitable for the inflatable structure 1 at hand to support that the inflatable structure 1 in the deflated state temporarily may be secured in a flat shape and/or in the inflated state temporarily be secured in a three-dimensional shape.

The expression fastening "arrangements" may refer to fastening "means", whereas "in the inflated state detachably" secure may refer to "in the inflated state temporarily" secure and/or "in the inflated state while in the inflated state" secure. According to an example, the expression "detachably secure" may refer to "detachably fasten two or more of the two or more interconnected chambers to each other to secure". The expression "secure" the inflatable structure may refer to "fixate" and/or "maintain" the inflatable structure, while "in the deflated state detachably" secure may refer to "in the deflated state temporarily" secure and/or "in the deflated state while in the deflated state" secure. "Compact" shape, on the other hand, may refer to "flat", "two-dimensional" and/or "essentially two-dimensional" shape.

Figure 4C:
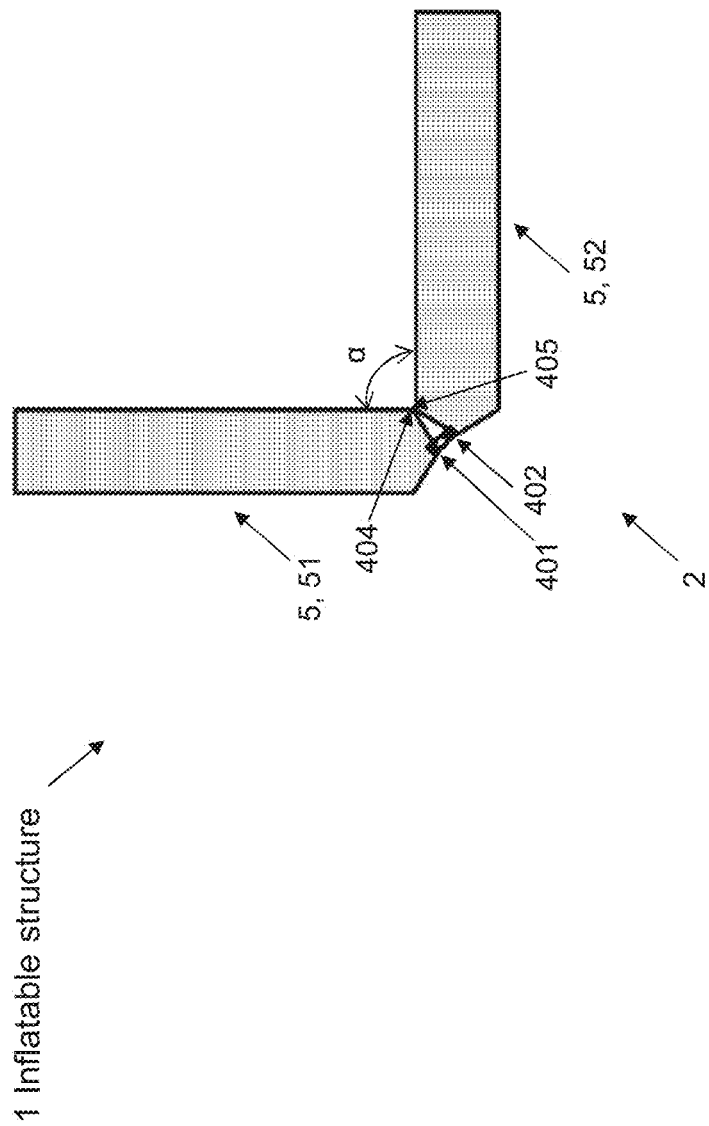

FIG. 4 illustrates schematic views of a portion of an exemplifying inflatable structure 1 in an inflated state according to embodiments of the disclosure. More specifically, FIG. 4a illustrates a side view of the inflatable structure 1 unfolded, FIG. 4b a top view of the unfolded inflatable structure 1, and FIG. 4c a side view of the inflatable structure 1 folded.

Optionally, and as demonstrated in FIG. 4, the one or more folding lines 4 may comprise at least a first set 400 of folding lines—e.g. the one or more seams 7 may comprise at least a first set of seams—defining the inflatable structure 1 into a first 51 and at least a second 52 interconnected chamber. The at least first set 400 of folding lines comprises a first folding line 401 and at least a second adjacent folding line 402 at least partly parallel to the first folding line 401. A width 403 of the at least first set 400 of folding lines define an angle α at which edges 404, 405 of the first interconnected chamber 51 and the at least second interconnected chamber 52 upon folding in the inflated state abut. Thereby, the first set 400 of folding lines supports that the first 51 and the second 52 interconnected chambers in the inflated state are foldable up to a sufficient desirable degree α along said first set 400 of folding lines, before edges 404, 405 of the first 51 and the second 52 interconnected chambers come into contact and subsequently may prevent further folding exceeding said angle α. Accordingly, a more robust and rigid inflatable structure 1 in the inflated state may be provided, in that edges 404, 405 of adjacent interconnected chambers may abut and thus give one another support.

The respective widths 403 of the one or more sets 400 of folding lines may be purposely selected as deemed suitable for the inflatable structure 1 at hand, and for instance range from less than a millimetre up to several tens of millimetres. Correspondingly, the at least first set of folding lines may comprise any appropriate number of folding lines 4 deemed suitable to reach a desired width 403, and range for instance from 2 up to tens of folding lines 4. Similarly, the respective folding angles α may be purposely selected as deemed suitable for the inflatable structure 1 at hand, and for instance range from 0 degrees up to close to 180 degrees.

The expression "a set of folding lines" may refer to "a set of angle-influencing and/or width-adapted folding lines", whereas "a second adjacent folding line" may refer to "a second folding line adjacent in a transverse direction of the at least first set of folding lines". A second adjacent folding line "at least partly parallel to the first folding line", on the other hand, may refer to a second adjacent folding line "parallel to the first folding line along at least a portion of its extent and/or elongation", whereas "adjacent" folding line may refer to "adjacent and separate" folding line. "A width of the at least first set of folding lines defining" may refer to "a width of the at least first set of folding lines in a longitudinal direction of the at least first set of folding lines defining" and/or "a width of the at least first set of folding lines is adapted to define". The expression "defining" an angle may refer to "restricting", "determining" and/or "setting" an angle, whereas "angle" may refer to "folding angle" and/or "desired angle". "Edges", on the other hand, may refer to "adjacent edges", "interconnected edges" and/or "inner edges", whereas upon folding in the inflated state "abut" may refer to upon folding in the inflated state "meet" and/or "come into contact"

Figure 5:
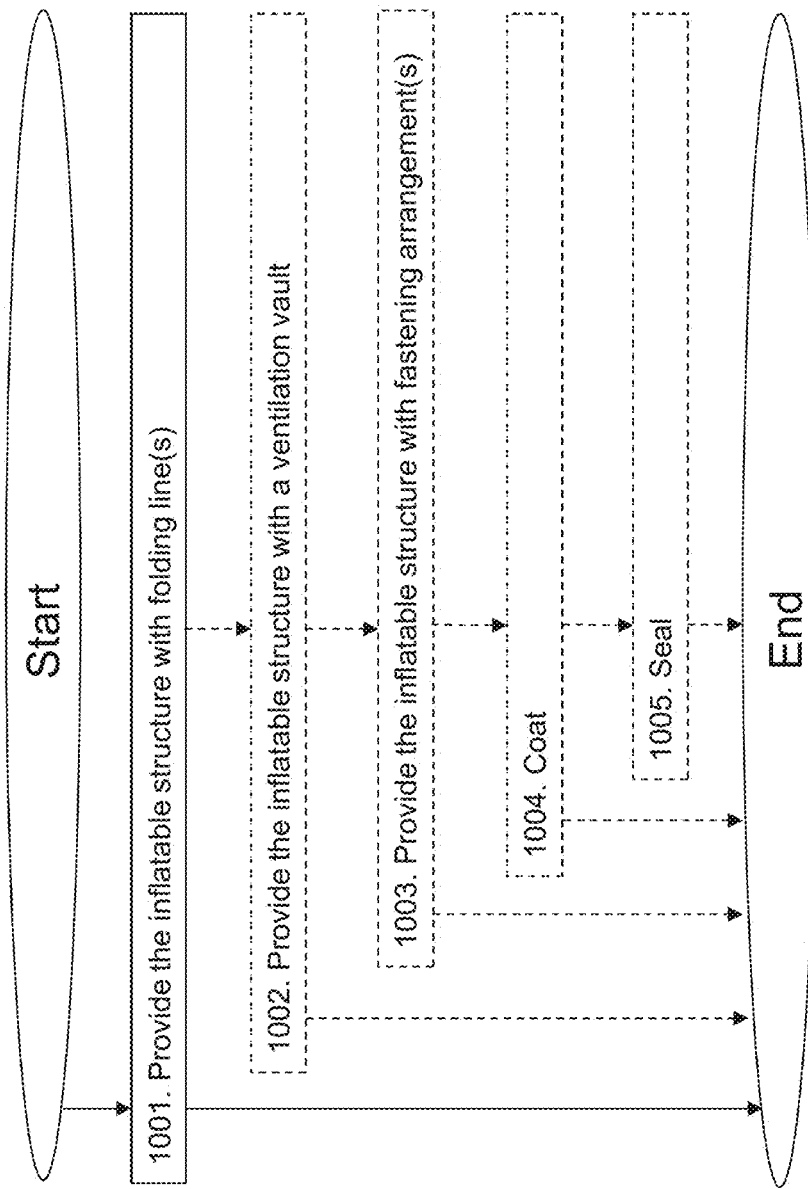
FIG. 5 is a flowchart depicting an exemplifying manufacturing method according to embodiments of the disclosure.

FIG. 5 is a flowchart depicting an exemplifying manufacturing method according to embodiments of the disclosure. Said method is for manufacturing a foldable inflatable structure 1, which inflatable structure 1 is transformable between a deflated state and an inflated state. The inflatable structure 1 comprises a drop stitch fabric 2 having a first layer 21 and a second layer 22 tethered by drop stitches 3. The exemplifying method, which may be continuously repeated, comprises the following action(s) discussed with support from FIGS. 1-4. The actions may be taken in any suitable order, and/or one or more actions may be performed simultaneously.

Action 1001: In Action 1001, the inflatable structure 1 is provided with one or more folding lines 4 defining the inflatable structure 1 into two or more interconnected chambers 5, the one or more folding lines 4 comprising coupling means 41 coupling the first layer 21 to the second layer 22, wherein dimensions 6 of the one or more folding lines 4 and/or coupling means 41 are adapted to enable the inflatable structure 1 to in both the deflated state and the inflated state be foldable along the one or more folding lines 4.

Action 1002: In optional Action 1002, the inflatable structure 1 may be provided with a ventilation vault 9 for inflation and/or deflation of the inflatable structure 1.

Action 1003: In optional Action 1003, the inflatable structure 1 may be provided with one or more fastening arrangements 10 adapted to in the inflated state detachably secure the inflatable structure 1 in a three-dimensional shape, and/or adapted to in the deflated state detachably secure the inflatable structure 1 in a flat shape.

Action 1004: In optional Action 1004, the inflatable structure 1 and/or the drop stitch fabric 2 may be coated.

Action 1005: In optional Action 1005, the inflatable structure 1 and/or the drop stitch fabric 2 may be sealed.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. An inflatable structure transformable between a deflated state and an inflated state, the inflatable structure comprising:
   a drop stitch fabric having a first layer and a second layer tethered by drop stitches, the inflatable structure being provided with one or more folding lines defining the inflatable structure into two or more interconnected chambers, the one or more folding lines comprising coupling means coupling the first layer to the second layer,
   wherein dimensions of the one or more folding lines and coupling means are adapted to enable the inflatable structure to in both the deflated state and the inflated state be foldable along the one or more folding lines,
   wherein the one or more folding lines comprise at least a first set of folding lines defining the inflatable structure as a first and at least a second interconnected chamber, the at least first set of folding lines comprising a first sequential folding line and a last sequential folding line at least partly parallel to the first sequential folding line, and
   wherein a coupling means of each folding line of the at least first set of folding lines defines a fictious folding line axis extending from edge to edge of the inflatable structure, the coupling means of each folding line of the at least first set of folding lines extending along 50 percent or less of the associated fictious folding line axis, wherein at least 50 percent or more of each folding line of the at least first set of folding lines defines an extent along the associated fictious folding line axis without the coupling means and wherein a width between the fictious folding line axis of the first sequential folding line and the fictious folding line axis of the last sequential folding line of the first set of folding lines restricts an angle ($\alpha$) between the first interconnected chamber and the at least second interconnected chamber upon folding in the inflated state before edges of the first interconnected chamber and the at least second interconnected chamber abut adjacent the at least first set of folding lines, wherein a is greater than 0 degrees and less than 180 degrees.

2. The inflatable structure according to claim 1, wherein the one or more folding lines comprise one or more seams, and the coupling means comprise stitches.

3. The inflatable structure according to claim 2, wherein a length of each of the stitches between the first layer and the second layer is shorter than a length of the drop stitches.

4. The inflatable structure according to claim 3, wherein the length of each of the stitches is less than half of the length of the drop stitches.

5. The inflatable structure according to claim 1, wherein the one or more folding lines and coupling means leave one or more air passages within the inflatable structure between the two or more interconnected chambers.

6. The inflatable structure according to claim 5, wherein at least a first air passage is supported in that at least one folding line of the one or more folding lines of the at least first set of folding has an extent extending less than 99 percent along the associated fictious folding line axis.

7. The inflatable structure according to claim 1, wherein at least one of the two or more interconnected chambers in the deflated state is foldable by an angle of at least 135 degrees along the one or more folding lines.

8. The inflatable structure according to claim 7, wherein the inflatable structure in the deflated state is foldable along the one or more folding lines into a predeterminable flat shape.

9. The inflatable structure according to claim 1, wherein the inflatable structure in the inflated state is foldable along the one or more folding lines into a predeterminable three-dimensional shape.

10. The inflatable structure according to claim 1, further comprising a ventilation vault for inflation and/or deflation of the inflatable structure.

11. The inflatable structure according to claim 1, further comprising one or more fastening arrangements adapted to in the inflated state detachably secure the inflatable structure in a three-dimensional shape and/or adapted to in the deflated state detachably secure the inflatable structure in a flat shape.

12. The inflatable structure according to claim 1, wherein the inflatable structure and/or the drop stitch fabric is coated and/or sealed.

13. An inflatable pet cage comprising the inflatable structure according to claim 1.

14. The inflatable structure according to claim 1, wherein the drop stitch fabric is a single drop stitch fabric such that all drop stitch fabric of the inflatable product is continuous and included in the single drop stitch fabric, and wherein the single drop stitch fabric is coated such that the coated first layer and the coated second layer of the single drop stitch fabric and the coated one or more coupling means define non-permeable exterior surfaces of the inflatable structure.

* * * * *